United States Patent Office 3,421,944
Patented Jan. 14, 1969

3,421,944
PULSE BATTERY
Paul Bauer, Reseda, Calif., assignor to TRW Inc.,
a corporation of Ohio
Filed June 1, 1964, Ser. No. 371,299
U.S. Cl. 136—6                                6 Claims
Int. Cl. H01m *35/00;* H01m *21/00*

This invention relates to batteries and more particularly to light weight batteries capable of delivering high current short duration pulses.

A pulse battery has become technically feasible by utilizing new techniques for minimizing internal resistance by reduction of the conduction path length. This invention discloses techniques for minimizing both electrode thickness and interelectrode spacing to reduce the weight, for example, of a specially designed pulse battery to less than four pounds compared to equivalent capacitor storage weighing nine pounds.

In this invention, there is disclosed a pulse battery comprising a large number of series-connected cells having minimum weight and maximum electrical conductivity. The pulse battery is constructed as a lamellar stack of thin metal foil electrodes separated at the edges, for example, by thin plastic frames and at the center by porous separators filled with electrolyte. The entire stack is compressed between two end plates of aluminum or other low density metal which have a dual function of providing structural rigidity necessary to prevent motion of the internal components and also as the terminal portions of the battery which serve as current collectors.

The metal foil electrodes may consist of roll-bonded bimetallic foils, or, as in the case of a lead acid system, a single metal foil. The electrodes are preferably cemented to the plastic frames and the individual separators are mounted in place as an insert within the plastic separators. Subsequent cells are mounted in place by cementing each to the preceding one. Electrolyte is dispensed to each cell in metered quantities through a gap left in the plastic frame, which may then be closed by cementing, or by being filled with a porous Teflon plug or by a wet-proofed plug of another material which allows the venting of the small quantities of gas which may be formed during recharge operations.

Further objects and advantages will be made more apparent by referring now to the accompanying drawings wherein.

Figure 1:
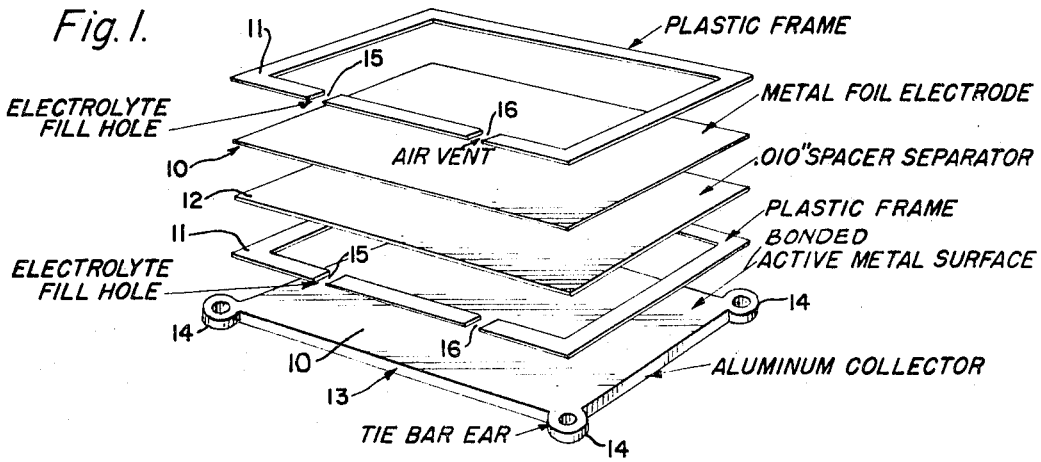
FIG. 1 is an exploded view of a pulse battery illustrating the partial assembly of the first two cells.

Referring now to FIG. 1, there is shown a lamellar stack of thin metal foil electrodes 10 separated at the edges by thin plastic frames 11. Inserted in the center of the frames 11 is a porous separator 12 having a thickness approximating that of the frame. The entire stack is compressed between two end plates 13 (only one plate 13 is illustrated) constructed of aluminum or other low density metal. The end plates provide the structural rigidity to all the electrodes 10 in combination with the porous spacers to prevent motion of the internal components. Suitable ear extensions 14 on the end plate 13 may be used for mounting the complete battery and as a current collector. The metal foil electrodes 10 may consists of roll bonded bimetallic foils or as in a lead-acid system, a single metal foil. The first single cell consists of the aluminum collector 13 having an active metal surface 10 bonded directly to the collector face. The plastic frame 11 is cemented on the periphery of the active metal surface 10 to insulate the electrodes from each other and also to contain the electrolyte. The porous separator 12 having the same thickness of the plastic frame 11 is cut to fit the inside area of the plastic frame and is inserted in a contacting relationship on the surface of the electrode 10. The succeeding metal foil electrode 10 is cemented on the periphery of the plastic frame 11, thereby comprising the first cell as a mechanical unitary structure. Electrolyte is dispersed to each cell in metered quantities through selected openings 15 in the plastic frame 11. Additional openings 16 in the plastic frames are filled with either a porous plastic such as a Teflon plug or other wet-proofed plug for venting purposes. The openings 15 may be sealed after being filled with electrolyte or simply filled with the Teflon plugs and used as additional venting holes.

The operation and design of the pulse battery will be best understood and appreciated by first reconsidering certain fundamentals. It is well known that the ability of battery to deliver high currents is limited by the internal impedance of the battery and the impedance of the load circuit placed across the battery terminals, in accordance with the equation, $$I = \frac{E_0}{R_L + Z_i} = \frac{E}{R_L} \qquad (1)$$

Where I is current, $E_0$ is the thermodynamic reversible potential, E is the terminal voltage of the battery, $R_L$ is the load resistance, and $Z_i$ is the internal impedance of the battery.

The total voltage drop, $e$, across the internal impedance is composed of three basic potential drops, or overpotentials.

$e_r$ = ohmic overpotential
$e_a$ = activation overpotential
$e_c$ = concentration overpotential Ohmic overpotential $e_r$ represents the voltage drop across the sum of the resistances of electrolyte and the metallic conductors within the battery. This overpotential appears instantaneously with current flow and may be minimized by increasing the conductivity of the various components of the battery and decreasing the length of the current path. This is a characteristic of the specific battery design and is minimized by decreasing the interelectrode spacing and the length of the intercell conductors and by increasing the cross-sectional area of both electrolyte and conductors.

The ohmic overpotential of any battery may be expressed by the equation $$e_r = \Sigma(I \rho h / A) \qquad (2)$$

where $\rho$ = specific resistivity
$h$ = thickness or length of resistance path
$A$ = cross-sectional area of resistance path Since the current and area, in this battery structure, are constant for all components, this becomes $$e_r = (I/A) \Sigma(\rho h) \qquad (3)$$

For a lead-acid cell (Pb-H$_2$SO$_4$-PbO$_2$) the resistivity of H$_2$SO$_4$ (32 percent aqueous, 25° C.) is 1.35 ohm-cm.

and the resistivity of lead is $21 \times 10^{-6}$ ohm-cm. Assuming an interelectrode spacing in such a cell of 0.010 inch, and a lead thickness of 0.001 inch, then if the ohmic overpotential is the only significant factor in the total voltage drop, the achievable current density, J, at ½ cell voltage (using $E_0=2.5$ volts/cell), or maximum power is:

$$\frac{2.50}{2}=1.25=\frac{1}{A}(1.35)(0.10)(2.54)+(21\times 10^{-6})(0.001)(2.54)$$

$$J=\frac{1}{A}=36.5 \text{ amperes/cm.}^2$$

Figure 2:
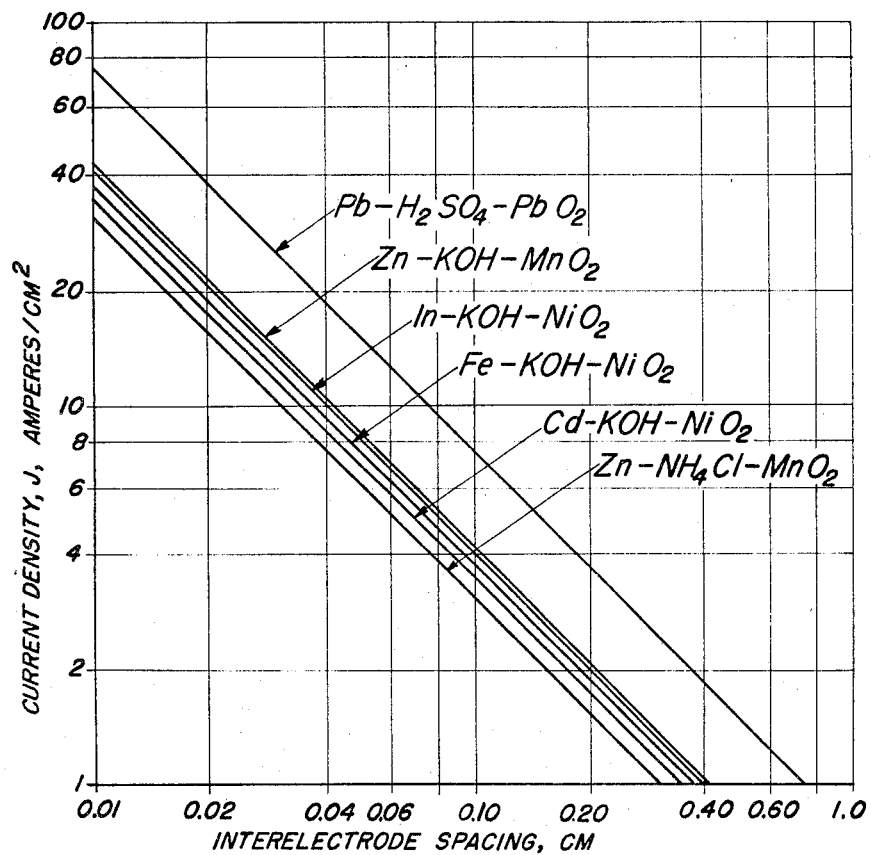
FIG. 2 is a curve of current density v.s. interelectrode spacing which illustrates the limits of achievable current density using various metals and electrolyte combinations, as determined by the ohmic resistance of them all, in combination.

FIGURE 2 shows the limits of achievable current density as determined by ohmic overpotential for lead-acid and other selected electrochemical systems constructed according to FIG. 1.

Activation overpotential, $e_a$ is associated with the energy of activation of the rate controlling reaction in the overall process of translation of a solvated ion through the electrical double layer, adsorption of the electrode surface, and discharge of the ion and evolution of gases at the electrode surface. The activation overpotential is usually quite small in comparison with the other forms of overpotential except in processes in which gases are evolved at the electrode surface. $e_a$ varies with current density, usually in accordance with the form of the following equation:

$$e_a = a - b \ln I \quad (4)$$

Since activation overpotential is a surface phenomenon, it may be reduced by increasing the true surface area of the electrode. Such processes as sandblasting, etching, sponge formation, or other surface roughening techniques are usually effective in reducing activation overpotential of an electrode. The time of development of activation overpotential at normal current densities is approximately $10^{-2}$ to $10^{-3}$ seconds.

Concentration overpotential $e_c$ is another major limiting factor in the delivery of current from a battery. This is caused by the depletion of ions of the reacting species in the small volume of solution in the region of the electrode. The current carrying capability of this depleted layer is then reduced to the rate of diffusion of the ions through the layer. Until this depletion occurs, no concentration overpotential is evident. The time required for development concentration overpotential is given by diffusion theory as follows:

$$T=\text{transition time}=D(nCF/2J)^2 \quad (5)$$

where

C=concentration g.-mols/cm.$^3$=$5.5\times 10^{-3}$
$n$=2 equivalents/mol
F=96,500=Faraday constant
D=diffusion coefficient ($0.75\times 10^{-5}$ assumed)
J=current density, At a current density $J=35$ amp/cm.$^{-2}$ $$T=\frac{(3.14)(5.5)^2(10^{-6})(4)(9.3)(10)^9(0.75)(10)^{-5}}{4(35)^2}=.0052 \text{ sec.}$$

Figure 3:
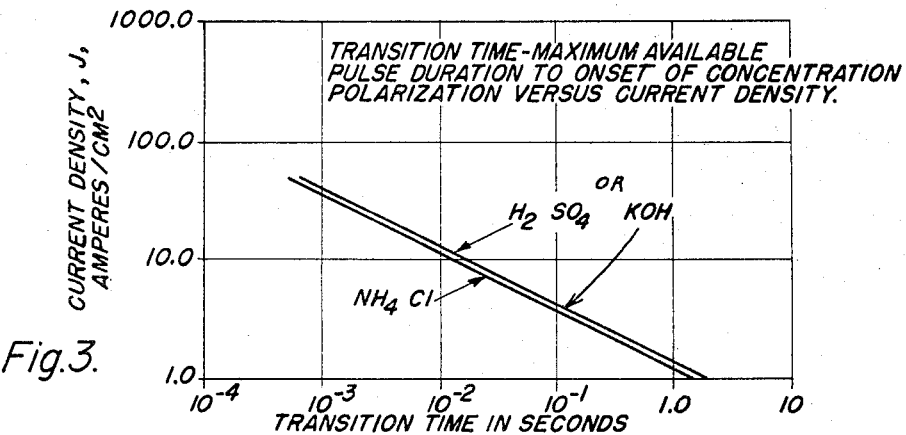
FIG. 3 illustrates the relationship between transition time and current density for several electrolyte systems.

In this example $e_c$ may be ignored by limiting the output pulse length to a figure that is less than the transition time. For example, an application requiring a load current pulse length of 840 μsec. would require that current densities of 88 amperes/cm.$^2$ would have to be drawn in order to reach the transition time before the end of the pulse. FIG. 3 shows the relationship between transition time and current density for acid and alkaline electrolytes.

By following the teachings contained in this patent, it is possible to minimize the resistance of the battery by utilizing the entire cross-sectional area of the electrode as the intercell connector and reduce the interelectrode spacing to an extremely small level. By reducing the interelectrode distance to 0.010 inch, the maximum achievable current density is raised to 36.5 amperes/cm.$^2$.

An application of the pulse battery in a lightweight flashing lamp system will help to explain the battery operation. The energy requirement for operation of a representative lamp is approximately 300 joules for 840 μsec. The power equivalent is as follows:

$$\text{Power}=\frac{300}{0.840\times 10}-3=3.57\times 10^5 \text{ watts}$$

Assuming a lamp internal resistance of 0.11 ohm (near the optimum lamp design value), the required voltage from the battery follows the relationship $$E=PR=3.57\times 1.1\times 10=200 \text{ volts}$$

At a voltage of 200 volts the current required is $$I=\frac{3.57\times 10^5 \text{ watts}}{2\times 10^2 \text{ volts}}=1.78\times 10^3 \text{ amperes}$$

and the cell area is $$A_c=\frac{I}{J}=\frac{1780 \text{ amperes}}{36.5 \text{ amperes/cm.}^2}=51.6 \text{ cm.}^2$$

Some conductive area loss may be expected with the use of a separator. Using microporous separators with 90 percent porosity, approximately 81 percent conductivity may be expected. The total of area/unit cell will be 51.6/0.81=69.0 cm.$^2$, or a 8.0 x 8.0 cm.$^2$. Assuming a frame width outside the active area of 0.5 cm., the total cell dimensions and weight are $$9.0\times 9.0\times 0.00254 = 0.206 \text{ cm.}^3$$

weight=11.3 gm. Pb/cm.$^3 \times 0.206 = 2.33$ gm./electrode

Since each cell operates at 1.25 volts

N=Number of cells=200 volts/1.25=160 cells

Total weight of lead=$2.33\times 161=375$ gm.=0.820 pound

Weight of plastic frames is $N(9.0\times 9.0)-(9.0\times 8.0)(0.010)(2.54)(0.95)$
$=0.430\times 160\times 69$ gm.

Weight of frames=0.134 pound

Weight of separators=$(64.0)(0.010)(2.54)$
$(0.95)(0.1)=0.155$ gm./separator $$\frac{0.155\times 160}{453.6}=0.055 \text{ pound/separator}$$

Weight of electrolyte (specific gravity=1.24)

$N(64.0)(0.010)(2.54)(1.24)(0.9)$
$=1.82$ gm.$\times 160$ cells=290 gm.

Weight electrolyte=0.640 pound

Estimated cement and hardware=0.30 pound

Current collector end plates=0.20 pound

A weight summary for a 200 volt, 1800 ampere, lead-acid battery is as follows:

| Material: | Weight (lb.) |
|---|---|
| Lead | 0.820 |
| Frames | 0.134 |
| Separators | 0.055 |
| Electrolyte | 0.690 |
| Cement and hardware | 0.300 |
| Current collectors | 0.200 |
| Total pulse battery weight | 2.199 |

Figure 4:
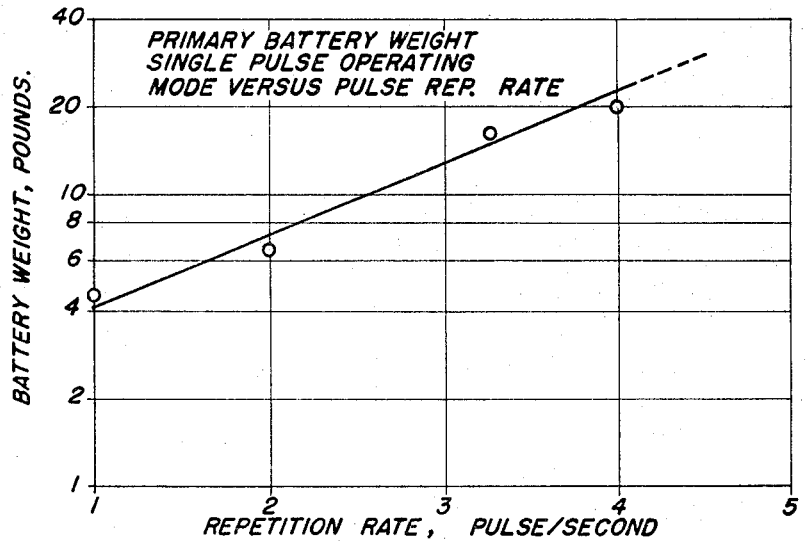
FIG. 4 illustrates the primary battery weight as a function of the pulse rate in the single pulse mode of operation.

This invention also contemplates a novel method of recharging the pulse battery that minimizes the primary recharging source current. The single or unit pulse mode is used, for example, by a pulse battery having a capability of delivering a single pulse of 1800 amperes, 200 volts, with an 840 μsec. duration, and is recharged completely for the next pulse in the available time between pulses. In this configuration, a series of 200 pulses could be delivered in a single continuous string, if desired. The recharge current required is an inverse function of the time interval available for recharge, or a direct function of the pulse repetition rate. The total discharge time of the primary battery in recharging the secondary may be (200 pulses at 4 persecond) or 50 seconds. This is higher than normal battery or other primary source current capability, and, as a result, the primary battery or other source must be oversized at the higher pulse repetition rates as is shown in FIG. 4.

If all 200 pulses must be delivered in a single continuous string of 4 persecond, the average recharge power required is:

$$P_r = 300 \text{ pulses/pulse} \times 4 \text{ pulses/sec.} = 1200 \text{ watts}$$

If the pulse repetition rate is reduced to 1 persecond, the recharge power is reduced to 300 watts. Further, by designing the battery to deliver 10 pulses at 4 persecond and by allowing a 30 second recharge interval between sets of 10 pulses, the recharge power becomes:

$$P_r = \frac{300 \text{ joules/pulse} \times 10 \text{ pulses}}{30 \text{ seconds}} = 100 \text{ watts}$$

In other words, by using a pulse battery, it becomes possible to vary the power level in the recharge system more than one order of magnitude by allowing small time intervals between groups of rapid pulses.

In other words, the pulse battery is charged to a capacity high enough to permit the delivery of bursts of several pulses without recharge followed by an extended recharge period. The total capacity of the battery is still extremely small 300 watt-sec./pulse/200 = 1.50 ampere-seconds
= 0.00042 ampere-hours/pulse This represents a total weight of lead equal to $$W = \frac{(1.50) \text{ amp-sec.} \times 207 \text{ gm. Pb/mol}}{96,500 \text{ amp-sec./equiv.} \times 2 \text{ equiv./mol}}$$

$$= 1.62 \times 10^{-3} \text{ gm. Pb}$$

from each side of the plate, or 3.12 mg. Pb/pulse. This is less than 0.2 percent of weight of a 0.001 inch foil electrode. Thus, the capacity for a series of 10 pulses could be readily developed on a thin lead foil without appreciably affecting the over-all thickness of the electrode.

The limiting factor, therefore, is the development of a concentration overpotential near the electrodes. If it is conservatively assumed that the diffusion process is so slow that essentially no diffusion takes place throughout the entire sequence of pulses, the 10 successive pulses of 840 μsec. length may be considered to be a single pulse of 8400 μsec. duration, then a current density can be calculated at which the transition time is equal to or greater than 8400 μsec. From Equation 5:

$$T = 8.4 \times 10^{-3}$$

$$= \frac{(3.14)(5.5)^2(10^{-6})(4)(9.3)(10^9)(0.75)(10^{-5})}{4J^2}$$

$$J^2 = \frac{26.50}{(4)(0.84)(10^{-2})} = 790$$

$$J = 28 \text{ amperes/cm.}^2$$

On a current density basis, therefore, the area and thus the weight of a 10 pulse battery will be:

$$\text{weight} = \frac{36.5 \text{ amp/cm.}^{-2}}{28.0 \text{ amp/cm.}^{-2}} \times 1.89 \text{ lbs.} = 2.46 \text{ lbs.}$$

The advantage in the multiple pulse mode of operation lies in the ability to produce bursts of pulses of high energy and repetition rate without the need for oversizing the primary source to deliver the high charging currents needed in the single pulse mode, provided that adequate time is allowed between sequential groups of 10 pulses to permit pulse battery recharge.

Figure 5:
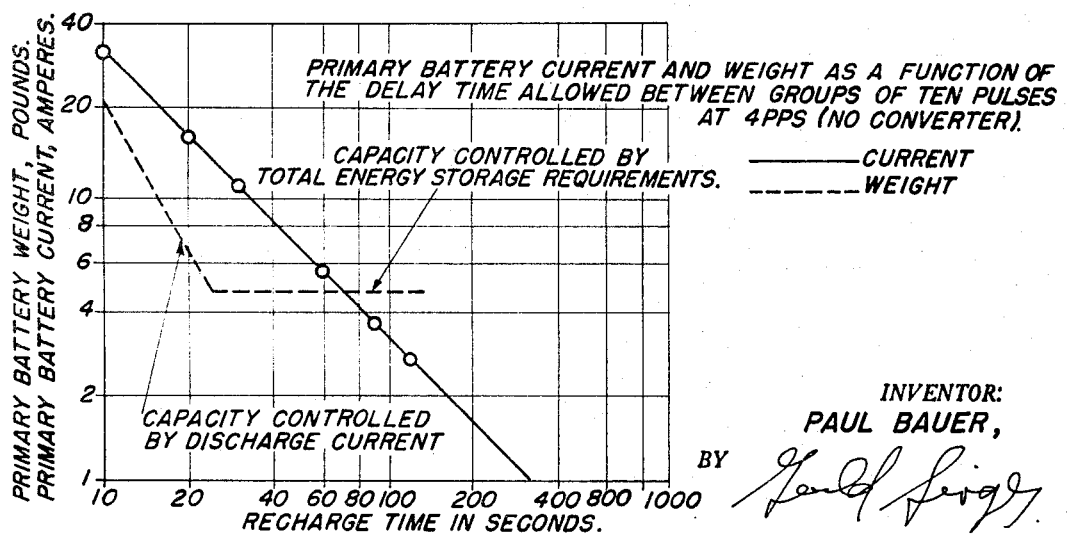
FIG. 5 illustrates the primary battery weight as a function of the allowable delay time between bursts of 10 pulses at 4 pps.

Battery processing would take place by electrolytic forming of active surfaces on the foil electrodes after the electrodes have been mounted on the plastic frames as shown in FIG. 1. This provides rigidity, automatic masking of unactive areas and minimum handling difficulties. FIG. 5 illustrates the current and the estimated weight of the primary battery required to recharge the pulse battery as a function of the allowable recharge time delay between sets of pulses.

This completes the description of the embodiments of the invention disclosed and illustrated herein. However, many modifications and advantages will be apparent to persons skilled in the art without departing from the spirit and scope of this invention.

The embodiments of the invention in which an exclusive property or privilege is claimed are defined as follows:

1. A battery comprising
   a plurality of metal foil electrodes in a spaced apart relationship each having a current collecting surface area that is substantially large with respect to said foil thickness,
   a spacer member bonded to the peripheral portion of each of said foil electrodes for maintaining said spaced apart relationship whereby said electrodes are held in an insulating and sealing relationship to each other,
   a porous insulator member having substantially the same thickness as said spacer member and substantially the same surface area as said electrodes located within said spacer member and in contact with said spaced apart electrodes, and at least two terminal members each having a current collecting surface area substantially equal to said electrodes and located in a contacting relationship with the outermost electrodes whereby said terminal members provide mechanical rigidity and current terminals for the battery structure.

2. A pulse battery according to claim 1 in which porous wetproof plugs are inserted in said spacer member to prevent leakage and permit gas escape.

3. A battery comprising
   a plurality of individual cells and at least two terminal members one at each end of said external cells,
   each of said cells comprising a plurality of metal foil electrodes having a current collecting surface area that is substantially large with respect to said foil thickness,
   a polymer spacer bonded to the peripheral portion of each of said foil electrodes for insulating and sealing said electrodes from each other,
   and a porous separation insulator member having substantially the same thickness as said spacer located within said spacer member and in contact with said electrodes,
   each of said terminal members having a current collecting surface area substantially equal to the electrodes and located in a contacting relationship with the external electrodes whereby said terminal members provide mechanical rigidity for the battery structure.

4. A battery comprising
   a plurality of metal foil electrodes in a spaced apart relationship each of said electrodes separated along the edges by a plastic spacer for insulating and sealing the peripheral portions of said electrodes from each other,
   a porous separator having substantially the same thickness as said spacer member located within said insulating member and in contact with said electrode, and
   at least two terminal members having a current collecting surface area substantially equal to the electrodes and located in a contacting relationship with the outermost electrodes whereby said terminal members provide mechanical rigidity for the battery structure.

5. A battery comprising
a plurality of bimetal foil electrodes in a spaced apart relationship each having a current collecting surface area that is substantially larger with respect to said foil thickness,
a spacer member located at the edge portion between opposing foil electrodes for insulating and sealing said electrodes from each other,
a porous separator member having substantially the same thickness as said spacer member and substantially the same surface area as said electrodes located within said spacer member and in contact with opposing electrodes, and at least two terminal members each having a current collecting surface area substantially equal to the electrodes and located in a contacting relationship with the outer most electrodes for providing mechanical rigidity and current terminals for the battery structure.

6. A battery comprising
a plurality of bimetal foil electrodes in a spaced apart lamellar relationship,
a plastic spacer member bonded to the edge portions of opposing electrodes for maintaining said spaced apart relationship in an insulating and sealing relationship to each other,
a porous insulator member having substantially the same thickness as said spacer member and substantially the same surface area as said electrodes located within said insulating member and in contact with said spaced apart electrodes, and at least two terminal members each having a thickness substantially greater by an order of magnitude than said electrode located in a contacting relationship with the outermost electrodes whereby said terminal members provide mechanical rigidity and current terminals for the battery structure.

References Cited

UNITED STATES PATENTS

| | | | |
|---|---|---|---|
| 2,632,784 | 3/1953 | Marsal et al. | 136—177.9 |
| 2,689,876 | 9/1954 | Lehovec | 136—100 |
| 3,201,280 | 8/1965 | Yumoto | 136—6 X |

WINSTON A. DOUGLAS, *Primary Examiner.*

A. SKAPARS, *Assistant Examiner.*